United States Patent [19]

Teletzke et al.

[11] 4,407,717

[45] Oct. 4, 1983

[54] WASTEWATER TREATMENT PROCESS

[75] Inventors: Gerald H. Teletzke; Allen H. Erickson, both of Wausau, Wis.

[73] Assignee: Sterling Drug Inc., New York, N.Y.

[21] Appl. No.: 444,350

[22] Filed: Nov. 24, 1982

Related U.S. Application Data

[63] Continuation of Ser. No. 214,450, Dec. 8, 1980, abandoned.

[51] Int. Cl.³ .............................................. C02F 3/04
[52] U.S. Cl. ................................... 210/616; 210/617; 210/631; 210/670; 210/694; 210/151; 210/201; 210/621
[58] Field of Search .............................. 210/615–618, 210/150, 151, 631, 670, 694, 201, 199, 200, 621, 622, 625

[56] References Cited

U.S. PATENT DOCUMENTS

| | | | |
|---|---|---|---|
| 2,086,753 | 7/1937 | Urbain et al. | 210/668 |
| 2,308,866 | 1/1943 | Dekema | 210/617 |
| 3,442,798 | 5/1969 | Schoeffel et al. | 210/663 |
| 3,640,820 | 2/1972 | Kemmer et al. | 210/625 |
| 3,658,697 | 4/1972 | Huether | 210/617 |
| 3,763,040 | 10/1973 | Timpe et al. | 210/694 |
| 3,767,570 | 10/1973 | Clapp | 210/618 |
| 3,803,029 | 4/1974 | Blecharczyk | 210/618 |
| 3,817,862 | 6/1974 | Hoke | 210/763 |
| 3,855,120 | 12/1974 | Garbo | 210/618 |
| 3,904,518 | 9/1975 | Hutton et al. | 210/610 |
| 3,966,599 | 6/1976 | Burkhead | 210/618 |
| 3,977,966 | 8/1976 | Pradt et al. | 210/616 |
| 4,053,396 | 10/1977 | Trense et al. | 210/618 |
| 4,168,228 | 9/1979 | Mallatt et al. | 210/616 |
| 4,172,781 | 10/1979 | Walk et al. | 210/694 |
| 4,179,374 | 12/1979 | Savage et al. | 210/903 |
| 4,200,524 | 4/1980 | Levin | 210/616 |
| 4,289,626 | 9/1981 | Knopp et al. | 210/616 |

FOREIGN PATENT DOCUMENTS

| | | | |
|---|---|---|---|
| 51-139169 | 12/1976 | Japan | 210/617 |
| 722851 | 3/1980 | U.S.S.R. | 210/618 |

OTHER PUBLICATIONS

Manual of Practice 8, Wastewater Treatment Plant Design, Water Pollution Control Federation, pp. 283–309 (1977).

Primary Examiner—Benoit Castel
Attorney, Agent, or Firm—Allen H. Erickson; Thomas L. Johnson; B. Woodrow Wyatt

[57] ABSTRACT

A process for treating wastewaters with a powdered adsorbent and one or more fixed media filters, wherein biological oxidation occurs. The adsorbent is optionally regenerated and reused. In multistage operation, adsorbent is contacted with wastewater in stagewise countercurrent flow, through each fixed media filter and subsequent clarifier, or through clarifier only.

29 Claims, 6 Drawing Figures

WASTEWATER TREATMENT PROCESS

This application is a continuation of copending application Ser. No. 214,450, filed Dec. 8, 1980, now abandoned.

BACKGROUND OF THE INVENTION

This invention relates to a process for treating wastewaters with a powdered adsorbent and one or more fixed media filters, also known as biological packed towers or trickling filters.

Fixed media filters have been commonly used for treating relatively weak wastewaters, especially in the aerobic embodiment known as the trickling filter. Typically, trickling filters are comprised of towers filled with crushed rock, field stones, wooden slats or plastic media which not only provide a large surface area for growth of biota, but whose interstitial spaces have dimensions adequate for flow of liquid downward and air upward or downward without large pressure drops or clogging with solids. Preclarification of wastes which contain solids is generally considered necessary to prevent clogging of the media void spaces. Media, such as rock, are usually 2 to 4 inches in diameter, with the larger material size prevalent in high rate filters. Recently developed plastic media provided even greater void space dimensions. Recirculation of wastewaters through the media is often provided to better maintain the biota viability and enhance the treatment level. Suggested flow diagrams can be found in Sewage Treatment Plant Design, WPCF Manual of Practice No. 8 (1977), Water Pollution Control Federation, pages 283-309. While the air flow in most trickling filter installations results from natural convection in the bed, forced aeration using blowers has also been used. See for example Dekema, U.S. Pat. No. 2,308,866 and Burkhead, U.S. Pat. No. 3,966,599.

In practice, trickling filters have been unable to attain the same removal of 5-day biochemical oxygen demand (BOD5) as for instance, activated sludge systems. Their use has usually been limited to applications where effluent BOD5 of 20 to 40 mg/l is acceptable, or where partial treatment is applicable. Substantial nitrification has rarely been achieved in existing trickling filter installations. When it has occurred, denitrification in the final clarifier has often caused flotation of suspended solids and carryover into the treated wastewater effluent.

Ideally, biological solids which form on the media surfaces will naturally slough from the surfaces at the same rate as formed, to maintain a large viable population of organisms for removing wastewater constituents. In practice, however, sloughing often occurs intermittently, usually at times of overloading or when toxic materials are introduced into the wastewater. At such times, when the need for a high degree of treatment is greatest, the trickling filter loses much of its biological solids, and much reduced removals of BOD5 and suspended solids will occur and persist for long periods of time, often several weeks. Nitrification takes even longer to become re-established than carbonaceous BOD5 removal following such an upset.

The effluent quality of most trickling filter installations deteriorates under winter climatic conditions. The winter BOD5 removal is often 20-25 percent less than summertime removal.

Recent changes in some effluent standards have required removal of BOD5 to levels of 5-15 mg/l or lower, in addition to substantial nitrogen removal. Trickling filters per se have generally been unable to meet these standards; alternate, more expensive treatment methods have been proposed and used.

Packed columns of adsorbent such as granular activated carbon have been used for removing adsorbable components from waste streams, where only trace quantities of suspended solids are present in the waste. Even small amounts of solids will eventually clog the interstitial spaces and cause excessive headloss through beds of even the largest available carbon particles of 2 to 3 mm or larger diameter. Biological growths in or on the bed also severely restrict fluid flow and have prevented the use of carbon columns in such cases.

Upflow expanded beds have been used to eliminate plugging problems. The upward flow of liquid or liquid and air causes the carbon particles to become suspended in the mixture. Granular carbon of 0.4 to 1.7 mm particle diameter is typically used because of performance and cost advantages.

Using adsorbents such as activated carbon in mixed vessels is also known. For example, Timpe et al., U.S. Pat. No. 3,763,040 shows continuous water treatment in a plurality of tanks, where the activated carbon is transported countercurrent to the water flow.

Activated carbon is claimed to act as a catalyst to chemical oxidation under certain conditions. For example, Urbain et al., U.S. Pat. No. 2,086,753 discloses the non-biological oxidation of wastewater contaminants by sulfonated active carbon in the presence of hydrogen ion, iron and an oxygen containing gas. Also, Hoke, U.S. Pat. No. 3,817,862 shows oxidation of contaminants in the presence of activated carbon, independent of biological action.

More recently, combining biological oxidation with powdered activated carbon adsorption in the same mixed aerated vessel has become known. See Blecharczyk, U.S. Pat. No. 3,803,029 and Hutton et al., U.S. Pat. No. 3,904,518.

Regeneration of powdered activated carbon by aerobic or anaerobic biological treatment is shown in Blecharczyk, U.S. Pat. No. 3,803,029. Regeneration by wet oxidation is disclosed in Schoeffel et al., U.S. Pat. No. 3,442,798 and the incorporation of wet oxidation regeneration into an aerobic biological-physical treatment system is shown in Pradt et al., U.S. Pat. No. 3,977,966. In the later disclosure, the toxic waste is wet oxidized together with spent adsorbent to degrade the toxic substances and regenerate the carbon adsorbent prior to biologically treating the wastewater in combination with adsorbent.

SUMMARY OF THE INVENTION

Wastewater is treated to remove pollutional factors such as biochemical oxygen demand (BOD), nitrogen, color and toxic substances, using one to four fixed media filters in combination with a powdered adsorbent.

In one form of the invention, powdered adsorbent which will remove impurities from the wastewater is added to the wastewater and the mixture is passed downward through a fixed media filter having microorganisms attached to the media. Air is passed by natural convection or forced ventilation through the filter, either upward or downward.

In another aspect of the invention, a portion of the adsorbent-wastewater mixture or clarified wastewater which has passed through the filter may be recycled to the filter inlet. This portion is equivalent in volume of up to 300 percent of the influent wastewater.

The adsorbent in the remaining portion of adsorbent-wastewater mixture from the fixed media filter is separated from the mixture as a concentrated slurry. It is optionally recycled to the inlet of the fixed media filter where it is mixed with further portions of influent wastewater. A portion may be removed intermittently or continuously for regeneration and recycle to the incoming wastewater. Alternately, a portion occasionally may be removed for disposal, particularly if disposal is less expensive than regeneration. Such disposal may be preferred for very small wastewater treatment plants where regeneration costs per ton of adsorbent are high.

In one aspect of this invention, operation of a single-stage (i.e. one fixed media filter) continuous system utilizes the steps of:

(a) adding to the wastewater an adsorbent capable of adsorbing impurities from said wastewater, forming a mixture thereby;

(b) continuously passing said mixture downward through a fixed media filter through which air passes by natural or forced ventilation and having microorganisms attached to the media, wherein wastewater, adsorbent, microorganisms and air are contacted;

(c) returning a portion of said mixture which has passed through the fixed media filter in step (b) to the influent wastewater in step (a), in volume equivalent to up to 300 percent of said influent wastewater; and (d) passing remainder of said mixture from the fixed media filter to a quiescent settling-clarification zone where the settleable solids separate from the treated wastewater.

The powdered adsorbent may be for instance any material which adsorbs contaminants from wastewater. Powdered activated carbon (PAC) of which at least one-half of the weight comprises particles of 0.03 to 0.3 mm effective diameter, is the preferred adsorbent. Other adsorbents such as fly ash, fuller's earth or diatomaceous earth may also be used.

The amount of adsorbent added may vary from 25 to 8000 mg. per liter of wastewater, depending upon wastewater characteristics, discharge requirements and economics.

A portion of the adsorbent containing solids discharged from the settling-clarification zone may be recycled. A further portion may be regenerated and recycled, or disposed of. The regeneration step is preferably wet oxidation; furnace regeneration or anaerobic biological treatment may also be used.

The wastewater-adsorbent mixture may be passed serially through two, three, or four media filters, each followed by a solids-liquid separator such as a settler-clarifier; where the adsorbent is passed through the system in overall countercurrent relationship to the wastewater passing from stage to stage, but in cocurrent flow within each tower, i.e., wastewater and adsorbent pass downward together through each tower.

The invention utilizing two stages comprises the steps of:

(a) passing influent wastewater downward through a first fixed media filter through which air passes by natural ventilation and having microorganisms growing on the media surface;

(b) thereafter passing the wastewater from said first fixed media filter to a first gravity settler-clarifier, removing solids thereby and forming a first stage clarified wastewater;

(c) adding to the first stage clarified wastewater from step (b) a solid powdered adsorbent capable of adsorbing impurities from said wastewater, forming a mixture thereby;

(d) passing said mixture downward through a final fixed media filter through which air passes by natural or forced ventilation and having microorganisms growing on the media surface, whereby wastewater, adsorbent, microorganisms and air are intimately contacted.

(e) thereafter separating solids from the mixture passing from said final filter in a final gravity settler-clarifier to produce a final stage clarified wastewater;

(f) thereafter adding adsorbent-containing separated solids from final gravity-clarifier to further portions of influent wastewater and passing influent wastewater and solids downward through the first fixed media filter whereby wastewater, adsorbent, microorganisms and air are intimately contacted;

(g) thereafter passing waste water and solids from first fixed media filter in step (f) to first gravity settler-clarifier where solids are separated from the wastewater to produce a first stage clarified wastewater;

(h) continuously or occasionally passing a portion or all of separated solids from first gravity settler-clarifier to a regeneration process where adsorbed and settled wastewater constituents and microorganisms are destroyed and the adsorptive properties of the adsorbent are restored;

(i) recycling regenerated solids from step (h) to first stage clarified wastewater of step (g) and passing the resulting mixture through the final fixed media filter in step (d);

(j) recycling a portion or all of the remaining first stage separated solids from step (g) to the influent wastewater in step (f).

(k) continuously or occasionally adding fresh make-up adsorbent to compensate for adsorbent losses;

(l) continuously or occasionally removing ash which builds up in the system.

(m) passing final stage clarified wastewater to a further treatment step, reuse or disposal, and (n) repeating steps (c) through (m) in a continuous manner.

A further embodiment of this invention features 2 to 4 fixed media filters without intermediate settling-clarification zones. The powdered adsorbent accompanies the wastewater stream being treated in a generally cocurrent flow.

In further embodiments of the invention, three or four stages are utilized. As in the two-stage system, the overall movement of adsorbent is countercurrent to wastewater flow.

In another embodiment of this invention, adsorbent is mixed with wastewater passing from a fixed media filter to adsorb and flocculate contaminants therein for removal in a settler-clarifier. A high removal rate of solids and adsorbable matter results, without passage of adsorbent through the filter. The process comprises:

(a) passing said wastewaters to a primary quiescent settling-clarification zone to remove settleable solids and produce a primary clarified wastewater;
(b) passing said primary clarified wastewater downward through a fixed media filter through which air passes by natural or forced ventilation and having microorganisms growing on the media;
(c) adding a powdered adsorbent to the wastewater passing from said fixed media filter, forming a mixture thereby;
(d) passing said mixture to a secondary quiescent settling-clarification zone to remove settleable solids and produce a secondary clarified wastewater;
(e) passing settled solids from the secondary quiescent settling-clarification zone to influent wastewater passing to the primary quiescent settling-clarification zone;
(f) passing settled solids from primary quiescent settling-clarification zone to a regeneration step wherein the adsorptive properties of the adsorbent are at least partially restored and other organic solids are destroyed; and
(g) adding solids from the regeneration step to further portions of wastewater passing from said fixed media filter in step (c).

Such an embodiment is particularly useful where the influent wastewater contains a high concentration of soluble organic matter or contains substances toxic to the microorganisms attached to and growing on the filter media. This invention contacts freshly regenerated adsorbent with biologically-treated wastewater to remove trace quantities of organics, while also removing a large share of the influent organics or toxic substances. Thus the microorganisms are neither overloaded with food (excessive F/M ratio) resulting in depleted oxygen, nor poisoned by toxic matter.

In the preferred mode of operation, the adsorbent, PAC, is regenerated by wet oxidation. A small concentration of short chain soluble organics is elutriated from generated solids and pass to the influent wastewater stream.

In a further feature of this invention, an adsorbent is passed in generally countercurrent flow through a system comprising two or more fixed media filters, each followed by a settler-clarifier. In a two-stage system, the invention comprises the steps of:
(a) passing said wastewater to a primary quiescent settling-clarification zone to remove settleable solids and produce a primary clarified wastewater;
(b) passing said primary clarified wastewater downward through a first fixed media filter through which air passes by natural or forced ventilation and having microorganisms growing on the media;
(c) passing wastewater from first fixed media filter to a second quiescent settling-clarification zone to remove settleable solids and produce a first stage clarified wastewater;
(d) passing said first stage clarified wastewater downward through a second fixed media filter through which air passes by natural or forced ventilation and having microorganisms growing on the media;
(e) adding a powdered adsorbent to the wastewater passing from said second fixed media filter, forming a mixture thereby;
(f) passing mixture of wastewater from second fixed media filter and adsorbent to a final quiescent settling-clarification zone to remove settleable solids and produce a second stage clarified wastewater;
(g) passing settled solids from final quiescent settling-clarification zone to wastewater passing from first fixed media filter to said second quiescent settling-clarification zone, forming a mixture thereby;
passing settled solids from second quiescent settling-clarification zone to influent wastewater passing to said primary quiescent settling-clarification zone; and
(i) passing settled solids from said primary quiescent settling-clarification zone to a recovery, regeneration or disposal step.

One or more additional intermediate stages may be added between the first and final stages, where each stage comprises a fixed media filter followed by a settling-clarification zone.

DESCRIPTION OF THE PREFERRED EMBODIMENT

Figure 1:
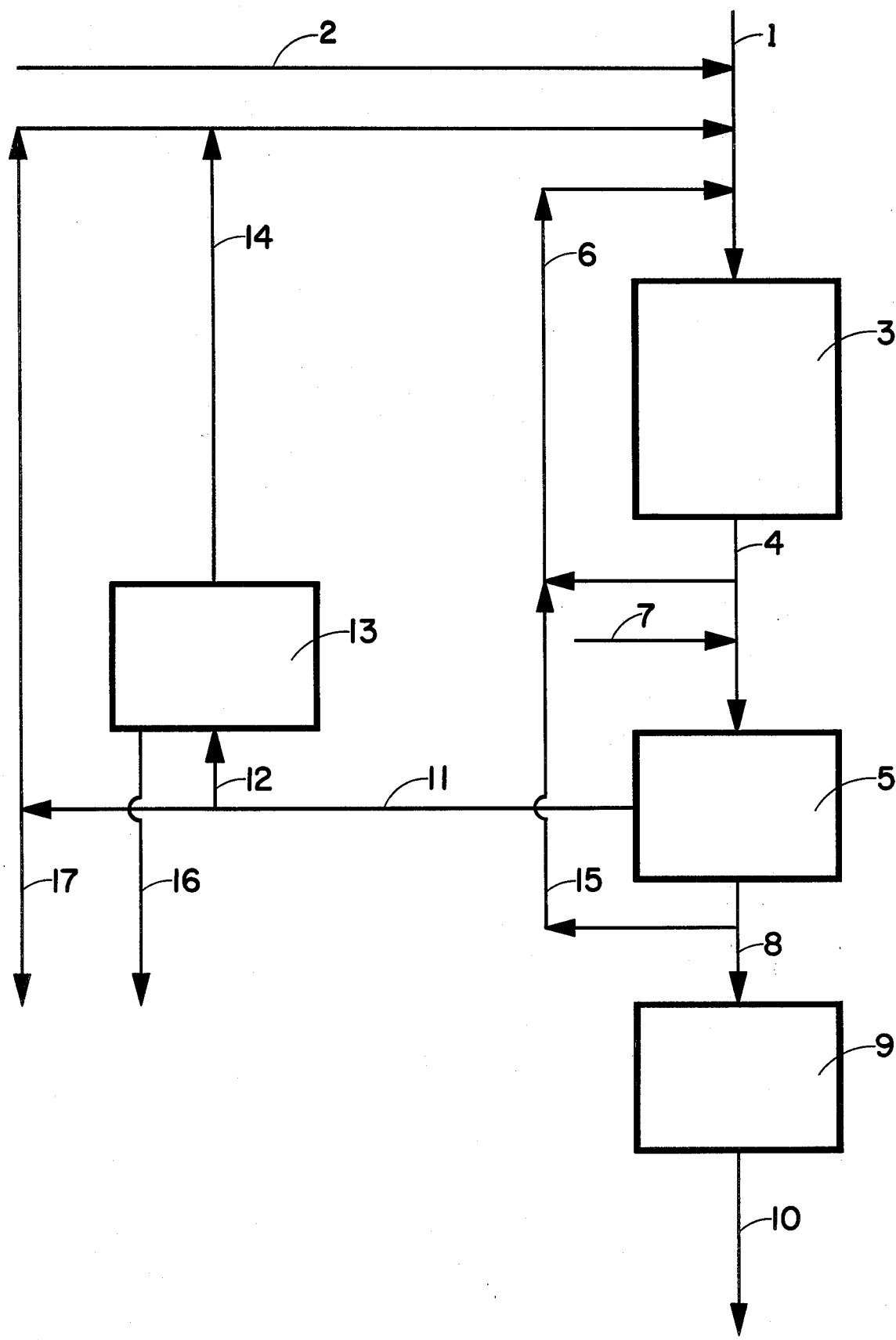
FIG. 1 is a schematic diagram of an embodiment of the invention utilizing a single stage of treatment in which passage of adsorbent through a single fixed media filter is followed by separation of solids in a settling-clarification zone.

Referring now more particularly to FIG. 1, powdered adsorbent 2 preferably powdered activated carbon (PAC) is added to clarified or unclarified wastewater 1 and the mixture is passed to a fixed media filter 3. The rate of adsorbent addition depends upon the required treatment level as well as the wastewater composition and characteristics of adsorbable components in the wastewater. Normally from 200 to 6000 milligrams of fresh and recycled adsorbent are carried per liter of wastewater, but the occurrence of toxic substances in the wastewater may require quantities as great as 8000 milligrams per liter. With some wastes, adsorbent concentrations as low as 25 milligrams per liter are effective.

Although powdered activated carbon is the preferred adsorbent, the use of other adsorbents such as fly ash, fuller's earth and the like is contemplated. The adsorbent particle size which provides a high surface area for adsorption and an optimal settling rate in the settling chamber is from 30 to 300 microns (0.03 to 0.3 mm) diameter, although a portion of the adsorbent particles may have either larger or smaller diameter.

When the incoming wastewater contains a high concentration of suspended solids, preliminary solids removal will extend the adsorbent life.

The medium of filter 3 may be rock, plastic, wood, or other material resistant to biological degradation; preferably of size and shape such that a high surface area per unit volume is presented and the interstitial spaces will not easily become clogged. The medium provides surface where intimate contact of biota, adsorbent and oxygen with wastewater constituents occurs.

The film formed on the surface of the medium consists of biomass together with adsorbent which is incorporated into its structure. The ratio of the mass of biological organisms to adsorbent in the film will depend essentially upon the solids residence time of the system, the composition of the waste fed to the system, and the concentration of adsorbent fed to the incoming wastewater. The adsorbent not only aids in the removal of adsorbable material from the wastewater, but also will have the effect of substantially increasing the residence time of adsorbable and slowly biodegradable substances. The net result will be removal of impurities far exceeding the adsorptive capacity of the adsorbent for those impurities and the avoidance of large fluctuations in removal efficiency.

A portion of the adsorbent remains suspended in the wastewater and passes through the media without becoming incorporated into the surface film. The fraction of the adsorbent remaining unincorporated generally increases as the adsorbent dosage is increased. In addition, surface film solids composed of adsorbent, biota and solids from the wastewater naturally slough continuously from the media. In spite of the presence of biological solids, ash and other solids in the adsorbent-containing wastewater, it will be referred to as adsorbent-waste water mixture.

As indicated in FIG. 1, wastewater 4 containing unincorporated adsorbent and sloughed solids issues from the fixed media filter. Preferable a portion 6 is recirculated to maintain the medium surfaces in a continuous or nearly continuous wetted state. The optimal hydraulic loading depends upon the medium characteristics, and for example, may range from 5 to 15 million gallons per day per acre for stone media, and 15 to 150 million gallons per day per acre for plastic media. The remainder of wastewater 4 enters a solid-liquid separation device 5, typically a quiescent settling-clarification zone or vessel. Rapid settling which results from the relatively high specific gravity of the adsorbent allows the use of a smaller settling vessel than would otherwise be required. A flocculating agent 7 may optionally be added to further aid in clarification.

Clarified wastewater 8 is optionally further treated with a particulate media filter 9 before discharge to the environment, reuse or tertiary treatment. Optionally, a portion 15 of clarified wastewater is recirculated together with or in place of the unclarified wastewater 6 to achieve the desired hydraulic loading on filter 3.

Settled solids 11 which contain both biomass and adsorbent are recirculated to the incoming wastewater 1.

When the preferred adsorbent, powdered activated carbon is used, the portion which remains in suspension provides several unique advantages. Not only does it provide adsorptive capacity for toxic materials, preventing their discharge to the receiving stream or poisoning of the attached biological solids, but an additional advantage is an increased capacity for oxygen transfer in the wastewater. Thus conditions in filter 3 conducive to nitrification are enhanced, namely, greater removal of BOD in the upper portion of the filter, higher solids residence time in the surface layer allowing a greater growth of nitrifying organisms, and much reduced propensity to upset by toxic substances or overloading.

A portion 12 of the adsorbent containing solids 11 may be regenerated by biological oxidation, anaerobic digestion, thermal treatment in a furnace or wet oxidation. Biological organic solids are destroyed and the adsorbent properties are renewed in the particular process 13 which is chosen. From the standpoint of effectiveness of regeneration, ease of operation and overall cost, wet oxidation is the preferred treatment for regeneration of activated carbon. Wet oxidation is particularly effective in destroying toxic substances adsorbed on activated carbon and effectively destroys excess biological matter. Aerobic biological treatment for a period of 4 hours to 30 days, or anaerobic digestion for 10 to 60 days may be used as alternative regeneration processes.

Ash 16 which may accumulate in the system is withdrawn for disposal preferably from the regeneration step 13 or alternatively, together with other settled solids 17 without regeneration.

In trickling filters of the prior art, toxic substances or organic overloading generally have led to excessive sloughing of biological solids from the media. As a result, treatment capability has deteriorated during periods of high loading and toxic waste introduction.

In this invention, simply increasing the rate of adsorbent addition will enhance removal of toxic substances and excess organic pollutants from the wastewater. Adsorbed materials are then destroyed in the regeneration process 13, and the effects of toxic materials and overloading upon the overall level of treatment will be minimal. The rate of adsorbent addition may be increased either by adding fresh adsorbent or stored regenerated adsorbent, or by increasing the rate of regeneration. The latter is particularly effective when severe toxicity leads to increasing sloughing of solids from the media.

Figure 2:
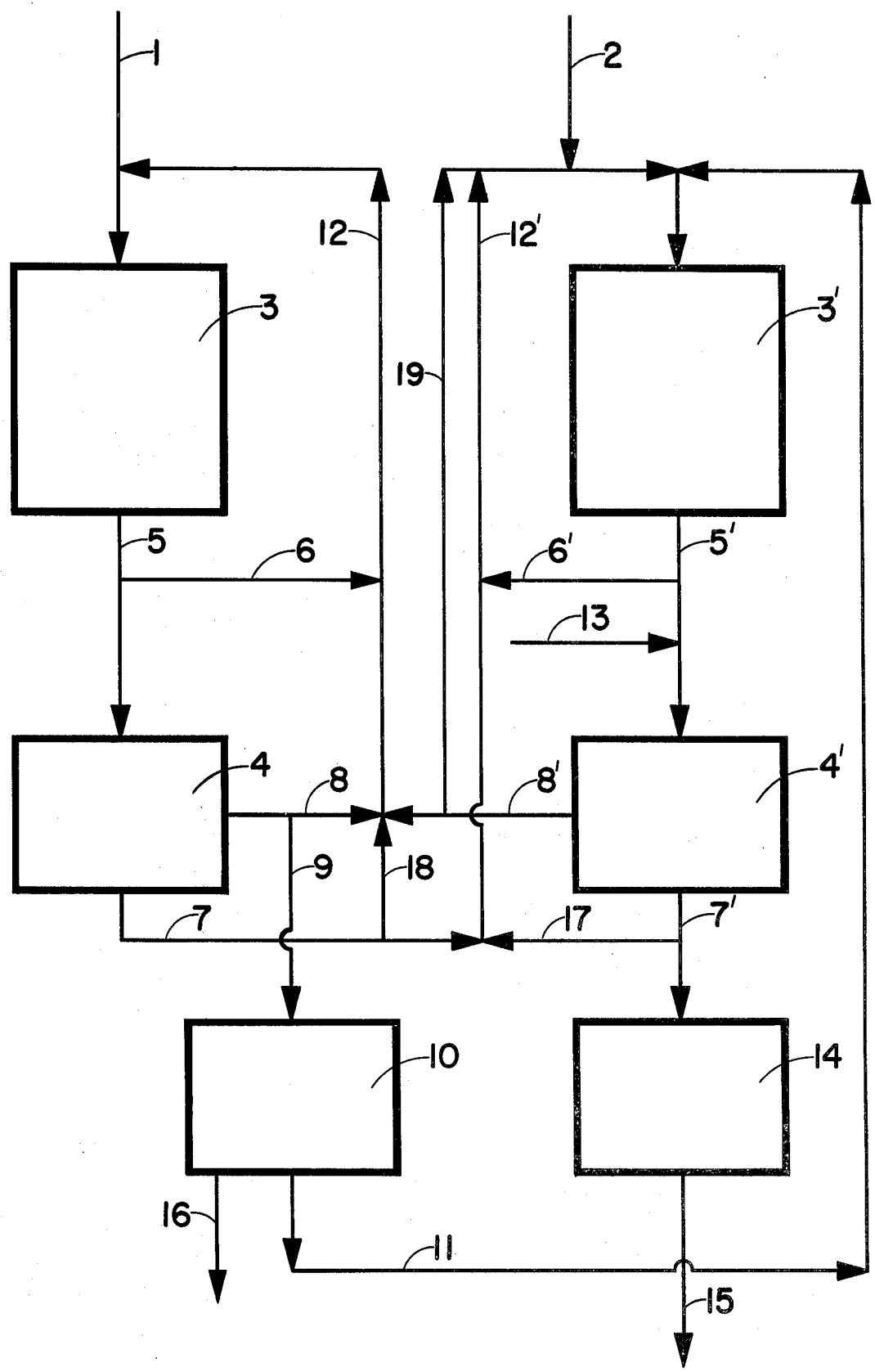
FIG. 2 is a schematic diagram of an embodiment of the invention utilizing two treatment stages.

Incorporation of an additional stage into the system results in further operational advantages which are illustrated in FIG. 2. The general flow of wastewater 1 through the system, excluding recirculation streams, is through the first fixed media filter 3 and into a settler-clarification vessel 4. The clarified wastewater 7 is transported to a second fixed media filter 3', through which it passes into a second settling-clarification vessel 4'. Treated and clarified wastewater 7' is discharged from this final settling-clarification vessel. If necessary, it may be passed through a particulate media filter 14 for final solids removal.

The adsorbent 2, preferably powdered activated carbon is added to the wastewater 12' entering the second filter 3'. After the initial addition, only small additions of fresh adsorbent are necessary to maintain the desired concentration in the wastewater. Effluent wastewater 5' containing adsorbent and sloughing biomass is clarified in solid-liquid separation device 4', typically a settling-clarification vessel. A flocculating agent 13 may be added to enhance clarification. A portion 6' of the solids containing wastewater 5' is preferably recirculated to the wastewater 12' entering the second tower, thereby maintaining the medium in the necessary wetted state. Optionally, a portion 17 of clarified wastewater 7' may be recirculated in addition to or in place of the recirculated unclarified wastewater 6′. This practice is typically followed when an excessive concentration of sloughed solids will otherwise be returned to the fixed media filter.

In FIG. 2, the adsorbent containing solids 8′ from settling-clarification vessel 4′ are combined with settled solids 8 and added to wastewater 1 entering the first filter 3. Thus the suspended adsorbent is moved in overall countercurrent relationship to the wastewater flow, achieving more efficient use of the adsorbent capacity.

Effluent mixture 5 from the first fixed media filter 3 is partially recirculated as stream 6 to the incoming wastewater 1, as previously indicated. The remainder enters the settling-clarification vessel 4 where adsorbent and biological solids are separated from wastewater. A portion 9 of these solids is regenerated by a process 10 of aerobic biological oxidation, anaerobic digestion, thermal treatment in a furnace, or wet oxidation. Wet oxidation is the preferred treatment process. The regenerated solids 11 are returned to the wastewater 12′ entering the second filter 3′. Optionally, a portion 18 of the clarified wastewater 7 may be recirculated to the incoming wastewaters 1 in addition to or in place of the unclarified wastewater 6. This action is typically taken when necessary to prevent a temporary overload of solids to filter 3 caused by excessive sloughing of solids.

Ash 16 which accumulates in the system is withdrawn for disposal preferably from the regeneration step or alternatively, with other settled solids from settling-clarification vessel 4. Without separation of adsorbent from ash, a small quantity of adsorbent will be lost with the ash.

Figure 3:
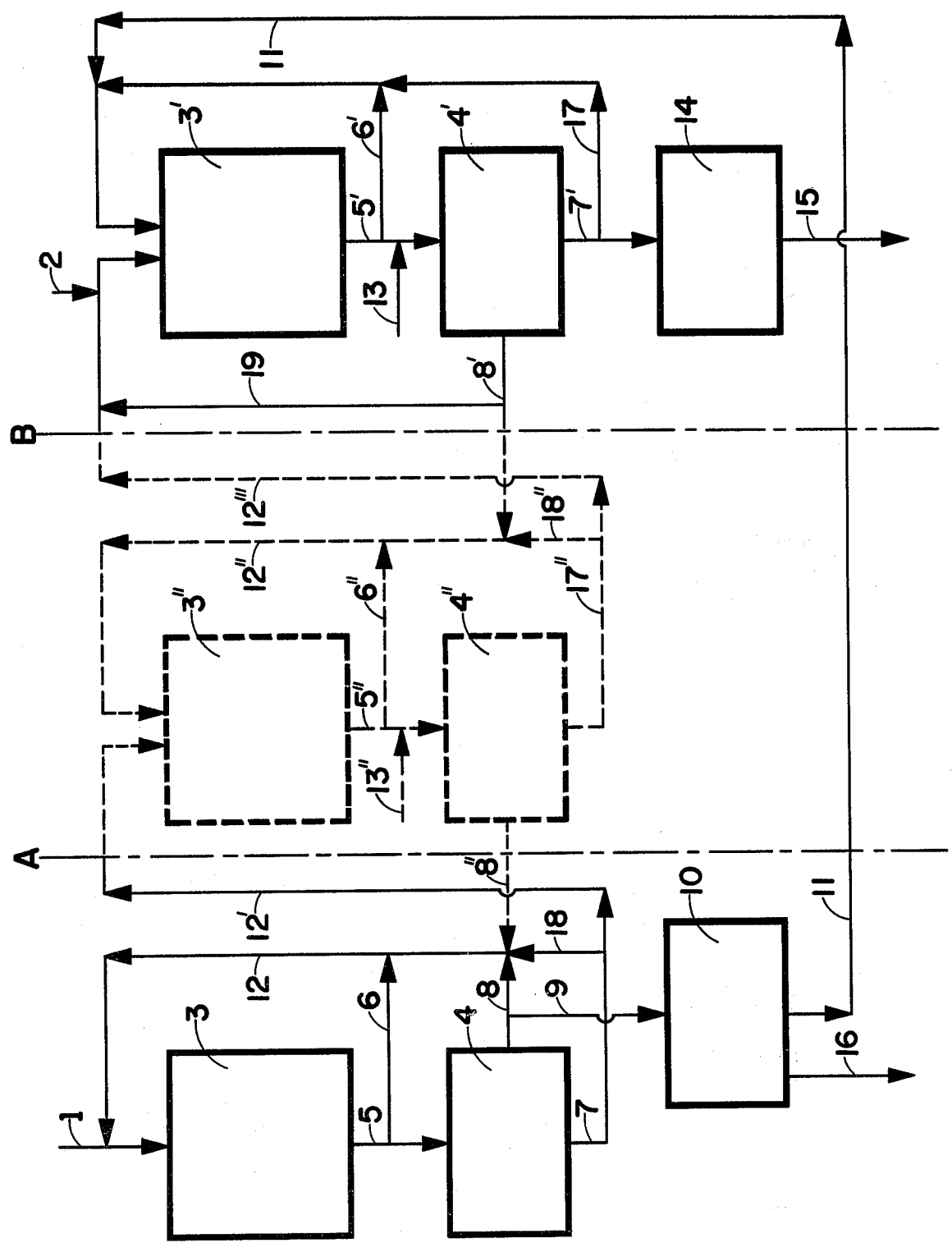
FIG. 3 illustrates the invention wherein three or four treatment stages are used.

While the foregoing is illustrative of a two stage system employing two fixed media filters, each followed by a solid-liquid separator, embodiments having three, four or more stages are also contemplated where one, two or more sets of filter-separator combinations are interposed between the first stage and final stage of FIG. 2, and separated solids are passed in stage-wise countercurrent flow to wastewater through the interposed and final stages. In FIG. 3, such an arrangement is illustrated by the addition of an intermediate stage drawn between vertical lines A and B. Alternately, two or more such intermediate stages could be used.

In FIG. 3, clarified wastewater 12′ from the first stage is combined with separated solids 8′ from the final stage and passed through fixed media filter 3″ and solid-liquid separator 4″. Separated solids 8″ are passed to the first stage and clarified wastewater 17″ is passed to the final stage. Alternatively a portion 6″ of solids and wastewater 5″ or a portion 18″ of clarified wastewaters 17″ is recycled to the wastewater 12′ entering the filter.

When the total system is operated as just described, most of the carbonaceous BOD5 removal will occur in the first filter, providing conditions conducive to proliferation of nitrifying bacteria in the second filter. Enhanced oxygen transfer capability resulting from the use of activated carbon will lead to a high degree of nitrification. If necessary during organic overloading, an oxygen containing gas may be injected into the first filter to prevent oxygen deficiency.

In prior art systems not using an adsorbent, limited denitrification of nitrate and nitrite ions to nitrogen gas often occurs in the settling-clarification vessels, lifting the mass of solids to the surface and causing solids to carry over into the treated wastewater. This unhappy predicament is prevented by using a highly settleable adsorbent of this invention, which will allow nitrogen gas bubbles to escape without carrying the solids upward.

This invention is particularly effective for treating toxic wastes. When toxic substances occasionally appear in the wastewater, the concentration of adsorbent can quickly and easily be increased to accommodate the toxic materials. Following the period of abnormal wastewater characteristics, the excess spent adsorbent is regenerated and stored for future use. For example, regenerated powdered activated carbon may be dewatered by filter press or other filter to greater than 50 percent solids and stored as a wet solid, or further dried and stored as a dry powder.

Fresh or regenerated adsorbent is added to the final fixed media filter, thereby adsorbing the last traces of toxic material and preventing harm to receiving waters.

Wet oxidation is the preferred regeneration process when wastewater contains toxic substances, because it effectively destroys a wide variety of such substances.

Figure 4:
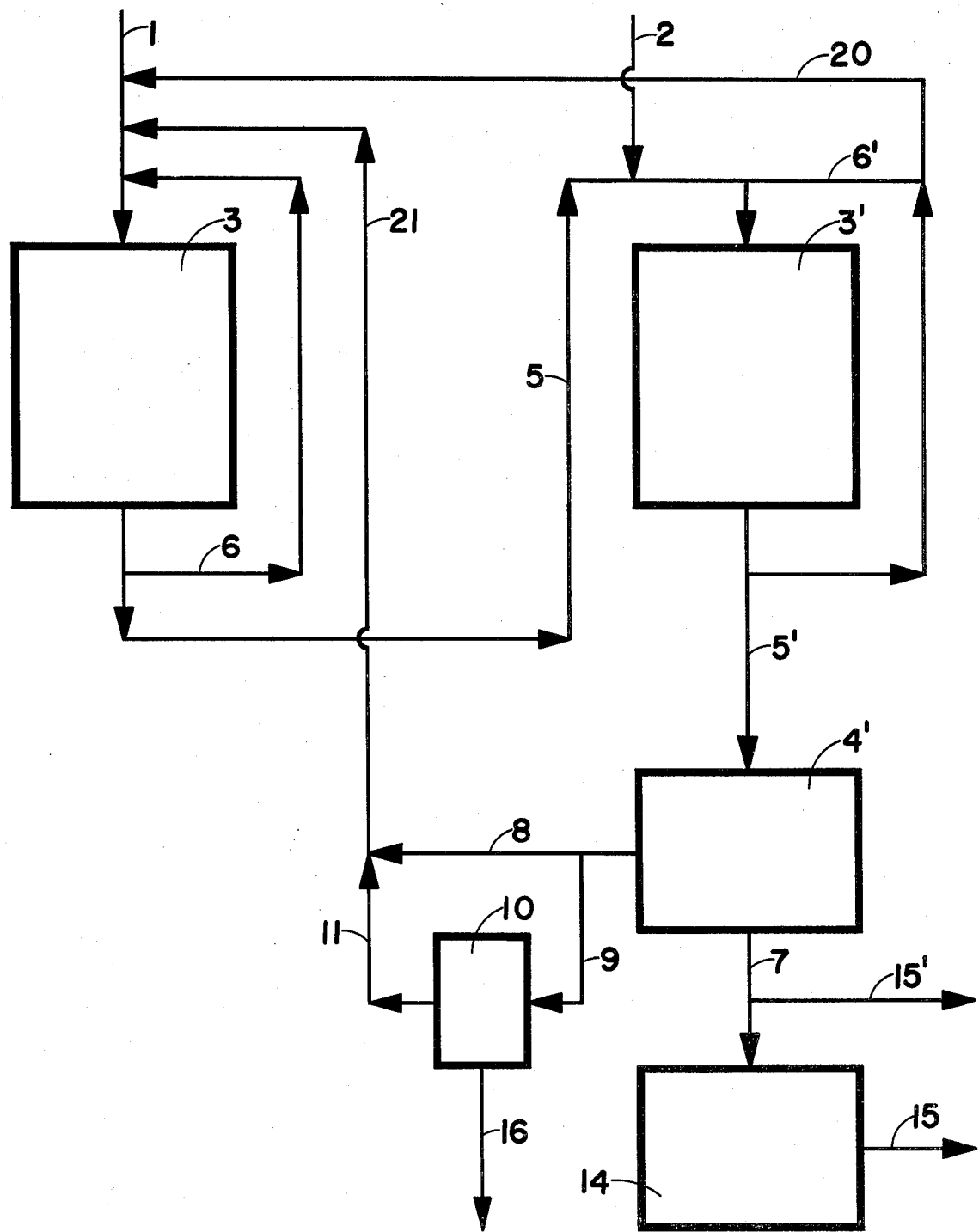
FIG. 4 is a schematic diagram of an embodiment of the invention in which adsorbent passes through the settling-clarification zones of a single stage fixed media filter system.

Turning now to FIG. 4, we see two stages 3 and 3′ of fixed media filter with a single final clarification-settling zone 4′. While two stages are shown, a total of three or more stages may be utilized with a single final settling-clarification zone.

In FIG. 4, influent wastewater 1 passes serially through fixed media filters 3 and 3′ and enters the settling-clarification zone 4′. Treated and clarified wastewater 15′ is discharged or is preferably filtered in granular medium (sand) filter 14 and discharged as stream 15 to a further treatment step, reuse or disposal.

Powdered adsorbent 2 is initially added to wastewater stream 5 entering the second treatment stage 3′. A portion 6′ of the wastewater-adsorbent mixture passing from filter 3′ is recycled to the same filter.

Adsorbent containing settled solids from settler-clarifier 4′ passes to a regeneration step 10 and regenerated adsorbent 11 is passed to influent wastewater 1. A portion 8 of unregenerated adsorbent may be passed directly to wastewater 1. Alternatively, a portion 20 of the wastewater-adsorbent mixture 5′ from the second fixed media filter may be recycled to the influent wastewater 1. Thus, adsorbent passes through both stages and is internally recycled within each stage as streams 6 and 6′. The total adsorbent concentration in the wastewater, including recirculated adsorbent 8, 11 and 20 is maintained at a desired level within the range of 25-8000 mg/l.

Ash components 16 may be removed in the regeneration step, extending the useful life of the adsorbent.

In another aspect of the invention, powdered adsorbent is added to the final clarifier of a fixed media filter treatment system, is settled and passed to the next upstream clarifier, so that the flow of adsorbent is in general countercurrent direction to the wastewater flow. The major portion of adsorbent does not pass through the fixed media filter or filters.

The result is a reduction in organic and toxic materials passing to the fixed medium filters, preventing upset of the biota caused by overloading or toxic substances. Septic conditions common to overloaded filters may be prevented, and a high level of treatment achieved.

Figure 5:
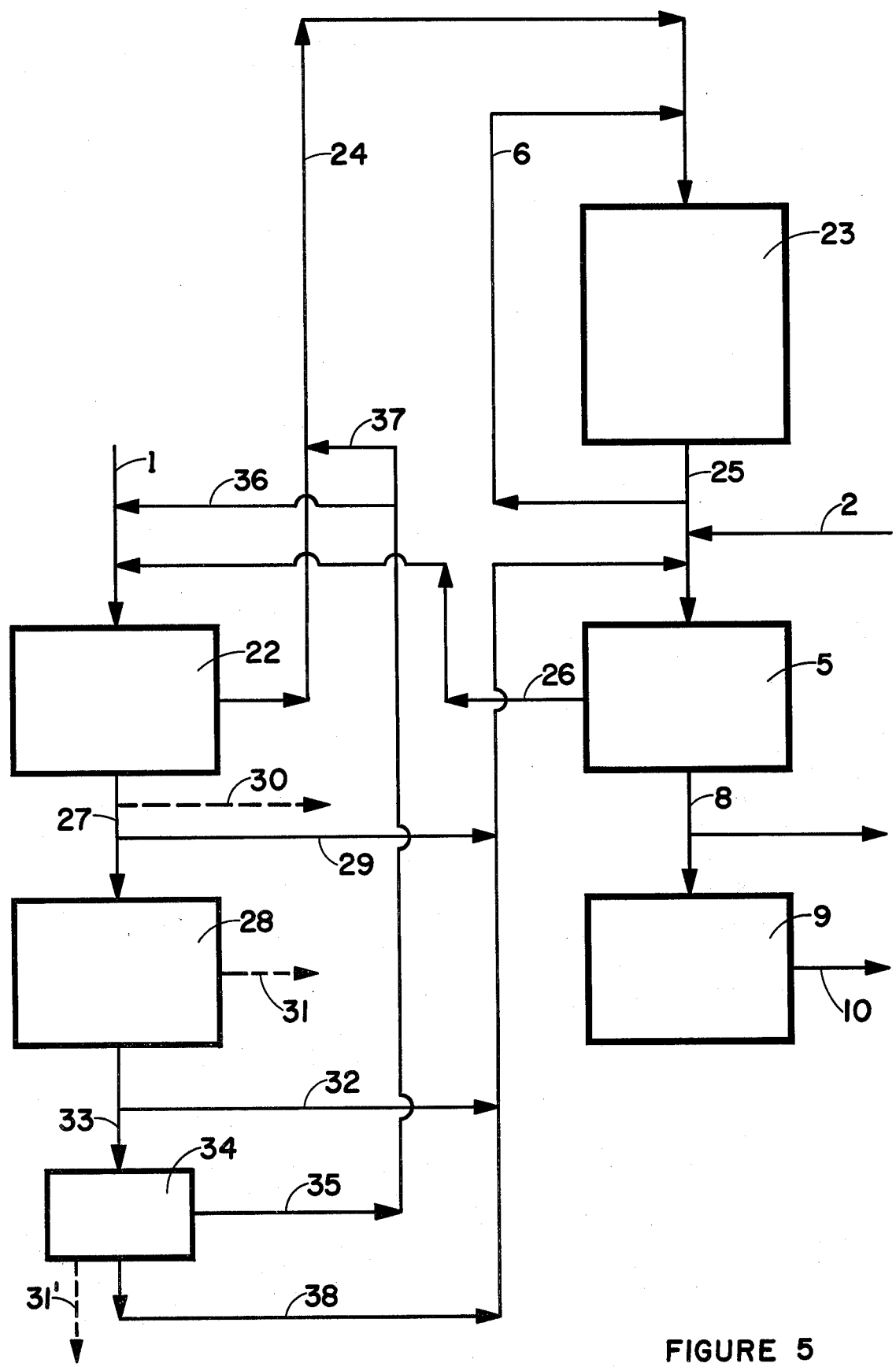
FIG. 5 illustrates the invention wherein two or more fixed media filter stages are used, and adsorbent passes through the settling-clarification zones without passing through the filters.

FIG. 5 is a flow diagram of such a process utilizing a single fixed media filter 23. Settleable solids in influent wastewater 1 are removed in primary settler-clarifier 22 and the clarified primary wastewater 24 is passed through filter 23. A portion 6 of the treated wastewater 25 may be recirculated through filter 23. Adsorbent 2, preferably powdered activated carbon is added to and mixed with wastewater 25 passing to the secondary settler-clarifier 5. Thus, treated and clarified wastewater 8 contains reduced concentrations of BOD, COD and solids. If necessary to meet strict regulations, a granular medium filter 9 may be used to remove trace quantities of suspended matter, or a flocculant may be added to wastewater 8 entering final settler-clarifier to further enhance clarification.

Adsorbent containing suspended solids 26 are mixed with influent wastewater 1 to remove substantial quantities of BOD, COD, suspended solids and toxic substances therefrom. Not only are soluble organic materials removed by adsorption, but the weighting effect of the adsorbent results in a very high removal of suspended solids.

The primary settled solids 27 may be passed to a regeneration process 28 where the adsorbent is regenerated and organic material present in the primary solids are destroyed. Alternatively, a portion 29 of the primary settled solids may be mixed with wastewater 25 passing to secondary settler-clarifier 5. Where economics permits, primary settled solids 30 may even be discharged to final disposal, for example, by land application or by dewatering and landfill.

The regeneration process 28 may comprise anaerobic digestion for a period of 10 to 60 days. The preferred regeneration process, however, is wet oxidation.

Ash 31 which accumulates in the primary settled solids 27 may be separated from the adsorbent during or following the regeneration process 28, by differences in specific gravity, and removed for disposal.

Regenerated adsorbent 32 is mixed with the biologically treated wastewater 25 passing to the final or secondary settler-clarifier 5. Typically however, the slurry of regenerated adsorbent contains a small concentration of low molecular weight non-adsorbable organics which are highly biodegradable. In an optional elutriation or washing step 34, these organics are removed into a water stream 35 which may be returned as stream 36 to the influent wastewater or as stream 37 to the fixed media filter 23. The regenerated adsorbent 38 is then passed to stream 25. This washing or elutriation step may also be used to separate and remove ash 31' from the adsorbent.

Figure 6:
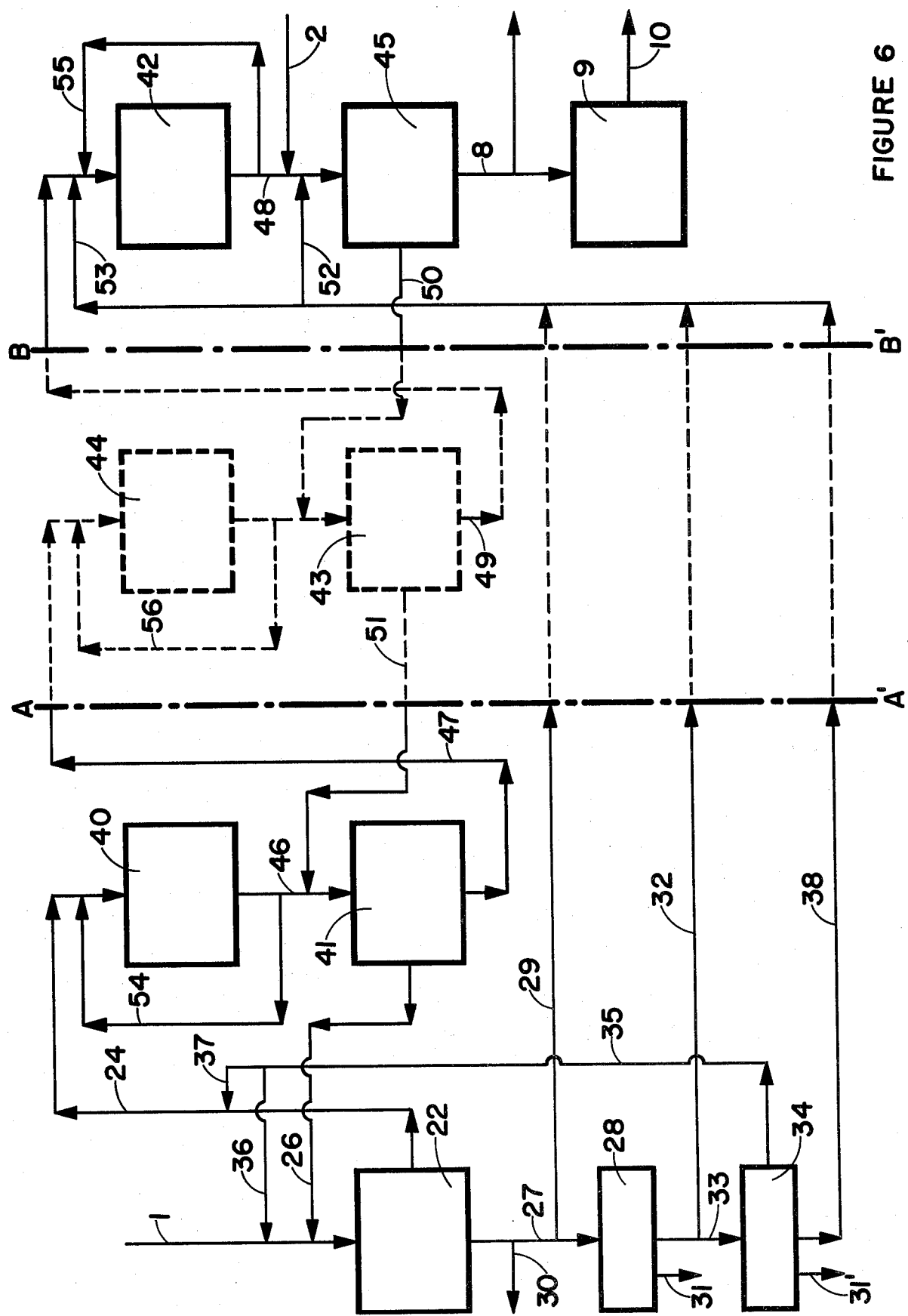
FIG. 6 is a schematic diagram of an embodiment of this invention wherein powdered adsorbent is mixed with wastewater and passed through a settler-clarifier in each stage of a two or more stage system. Adsorbent is transported generally countercurrent to wastewater flow.

The principles used in the embodiment of FIG. 5 may also be applied to a multi-stage fixed media filter system. Such an embodiment is illustrated in FIG. 6, having a first stage filter 40 and accompanying settler-clarifier 41, together with a final stage filter 42 with its final settler-clarifier 45. Optionally, one or more intermediate stages may be placed between the first and final stages, as indicated between lines A-A' and B-B'.

In FIG. 6, influent wastewater 1 enters primary settler-clarifier 22 where suspended solids are settled and removed. Clarified primary wastewater 24 is passed serially through each of the two or more stages, while powdered adsorbent 2 added to and mixed with wastewater 48 entering final settler-clarifier 45 is passed through each settler-clarifier in reverse order, removing soluble and suspended matter from wastewater in each stage and producing a progressively purified wastewater.

A two stage system is illustrated in FIG. 6 by superimposing line B-B' over line A-A', eliminating the intermediate stage and whereby flow lines intersecting lines A-A' and B-B' coincide.

Influent wastewater 1 is therefore passed to primary settler-clarifier 22 to remove settleable solids 27 and produce primary clarified wastewater 24, which is passed serially through first fixed media filter 40 and gravity settler-clarifier 41 to final fixed media filter 42 and gravity settler-clarifier 45.

Final clarified wastewater 8 is discharged to disposal, reuse or further treatment. Alternately, clarified wastewater 8 may be passed through granular medium filter 9 and discharged as purified wastewater 10.

Initially, powdered adsorbent 2 is mixed with wastewater 48 from final fixed media filter 42 and settled in gravity settler-clarifier 45. The resulting sludge 50 contains adsorbent, adsorbed solids and settleable suspended solids including microorganisms sloughed from the filter media. This sludge 50 is mixed with wastewater 46 passing from first fixed media filter 40 and removes a large quantity of dissolved and settleable material from the wastewater in gravity settler-clarifier 41. The resulting adsorbent containing settled sludge 26 is mixed with influent wastewater 1 and separated therefrom in primary settler-clarifier 22.

At least a portion of sludge 27 is passed to a regeneration step 28 where the adsorbent is regenerated and where adsorbed and settled wastewater constituents and microorganisms sloughed from the filter media are destroyed.

The regeneration step may comprise wet oxidation, anaerobic digestion, aerobic treatment or high temperature furnace regeneration.

A portion 30 of primary sludge may be removed for disposal. A portion 29 may optionally be recycled to the final stage where it is mixed with wastewater stream 48 passing to final settler-clarifier 45.

Regenerated adsorbent 32 is also recycled to wastewater stream 48. Alternatively, short chain hydrocarbons remaining in regenerated adsorbent 33 may be washed or elutriated in device 34 before passing to the final stage. The elutriate or wash water 35 is then passed to influent wastewater 1 as stream 36 or to the primary clarified wastewater 24 as stream 37.

Ash 31 which accumulates in the settled solids may be removed in the regeneration step or as stream 31' from the washing or elutriation process 34.

In a further embodiment of this invention, adsorbent containing solids 53 whether regenerated or unregenerated, are recycled to wastewater entering final fixed filter 42. Short chain compounds which may be present in the slurry or regenerated adsorbent containing solids, being highly biodegradable, are quickly consumed in filter 42.

Fresh adsorbent 2 is added as needed to make up for adsorbent lost in the regeneration step, discharged with the final effluent 8 or 10, or discharged to final disposal with ash stream 31 or 31' or settled solids 30.

EXAMPLE 1

A continuous pilot plant system was constructed according to the configuration of FIG. 1. The 10 inch diameter packed tower was filled to a depth of 10 inches with fixed media comprising one inch saddle packing. The clarifier was 8 inches in diameter and the sand filter provided 0.25 square feet of area with a bed depth of 5 inches. Powdered activated carbon particle size such that 70 percent passed through a 325 mesh screen was added as the adsorbent. Spent carbon was regenerated by wet oxidation in a stirred autoclave.

A municipal wastewater which was resistant to biological treatment was introduced at 150 ml. per minute. Powdered carbon was initially added to achieve a concentration of about 6700 mg/l in the wastewater. A portion 6 of the mixture 4 draining from the packed tower in volume equal to the influent wastewater, was recycled to the packed tower inlet. The remaining mixture of wastewater and carbon from the packed tower was passed to a clarifier 5 where the carbon solids were separated. The clarified wastewater was then passed through a sand filter to remove remaining particulate matter.

Clarifier underflow solids 11 were recycled to the packed tower inlet at a rate of 75 ml. per minute. The total hydraulic loading on the packed tower was 11.4 million gallons per acre per day.

Approximately 3 percent of the total carbon in the system was regenerated each day and returned to the wastewater influent.

During the test period of 46 days, 5-day Biochemical Oxygen Demand (BOD) of the wastewater was reduced from 48 mg/l to 11 mg/l following clarification and to 7.5 mg/l after sand filtration. A full scale fixed media filter operating at the same loading, but without the addition of adsorbent, reduced the wastewater BOD in the same period to 18 mg/l. A sand filter was not used with the full scale system.

EXAMPLE 2

In a process according to FIG. 2 wastewater 1 is passed through two fixed media filters 3 and 3', each of which is followed by solids-liquid separation in a clarification device.

Wastewaters 6 and 6' containing suspended solids are recycled at an average volumetric recycle ratio of 2 parts recycled wastewater per part of influent wastewater.

Powdered adsorbent is added to the wastewater entering the second fixed filter in order to maintain an adsorbent concentration of 5000 mg/l in the wastewater entering the first fixed media filter.

For a wastewater flow of 0.3 million gallons per day (MGD), 0.6 MGD of solids containing wastewater from the first filter is recycled. In the clarification device 4, preferably a gravity clarifier, solids are settled to a concentrated slurry 8 of about 0.03 MGD. Five percent of this stream is regenerated, and the remainder is recycled to the influent wastewater 1.

Clarified wastewater 7 is combined with fresh adsorbent 2 or regenerated adsorbent 11 and passed through a second filter 3'. Wastewater containing suspended solids exiting from the filter is recirculated to the filter top at a recycle ratio of 2. The remaining wastewater is separated and clarified in gravity clarifier 4'. A chemical 13 such as alum or polymeric agent may be added to enhance clarification. The treated and clarified wastewater 7' is passed through a sand filter 14 to remove small concentrations of suspended solid. A concentrated slurry 8' of adsorbent from clarifier 4' is passed to the inlet of the first fixed media filter 3.

With an influent wastewater flow of 0.3 MGD, the total flow through the first fixed media filter, including recycle, is 0.93 MGD. Approximately 39,000 pounds per day of adsorbent are carried through the filter. The adsorbent concentration in the wastewater passing through the second filter is 5 percent (i.e., 250 mg/l) of that in the first filter, and totals 1950 pounds per day.

Thus the adsorbent is transported through the system is stagewise countercurrent flow with the wastewater although the flow within each fixed media filter is cocurrent. A high concentration of partially exhausted adsorbent is maintained in the wastewater passing through the first filter, and a lower concentration of fresh or regenerated adsorbent is maintained through the second filter.

I claim:

1. A process for treating wastewaters, comprising the steps of:
   (a) forming a mixture of influent wastewater and a powdered adsorbent capable of adsorbing impurities from said wastewaters;
   (b) passing said mixture downward through a fixed media filter through which air passes by natural or forced ventilation and having microorganisms attached to the media, wherein wastewater, adsorbent, microorganisms and air are contacted; and
   (c) separating adsorbent from said mixture after passage through the fixed media filter to produce a treated and clarified wastewater.

2. The process according to claim 1, comprising the further step of recycling a portion of the treated and clarified wastewater through the fixed media filter, in volume equivalent of up to 300 percent of the influent wastewater.

3. A continuous process for treating wastewater, comprising the steps of:
   (a) adding to the wastewater an adsorbent capable of adsorbing impurities from said wastewater, forming a mixture thereby;
   (b) continuously passing said mixture downward through a fixed media filter through which air passes by natural or forced ventilation and having microorganisms attached to the media, wherein wastewater, adsorbent, microorganisms and air are contacted;
   (c) returning a portion of said mixture which has passed through the fixed media filter in step (b) to the influent wastewater in step (a), in volume equivalent of up to 300 percent of said influent wastewater; and
   (d) passing the remainder of the mixture from the fixed media filter to a quiescent settling-clarification zone where the settleable solids separate from the treated wastewater.

4. The process according to claim 3, in which the adsorbent is powdered activated carbon, at least one half having particle diameters of 0.03 to 0.3 mm.

5. The process according to claim 3, in which the amount of adsorbent added ranges from 25 to 8000 mg/l.

6. The process according to claim 3, further comprising the step of removing solids from the wastewater prior to forming a mixture thereof with adsorbent.

7. The process according to claim 3, further comprising the step of adding a flocculating agent to the mixture entering said quiescent settling-clarification zone.

8. The process according to claim 3, further comprising the step of passing the treated and clarified wastewaters downward through a second fixed media filter wherein the treated and clarified wastewaters are intimately contacted with air and microorganisms.

9. The process according to claim 3, further comprising the step of passing the treated and clarified wastewaters through a particulate media filter.

10. The process according to claim 3, further comprising the step of recycling a portion of separated settleable solids from step (d) to further portions of influent wastewater in step (a).

11. The process according to claim 3, further comprising the steps of:
(e) passing a portion of the settled solids from step (d) to a regeneration process where adsorbed and settled wastewater constituents are destroyed and the adsorptive properties of the adsorbent are restored; and
(f) passing the regenerated adsorbent from step (e) to further portions of influent wastewater in step (a).

12. The process according to claim 11, in which the adsorbent regeneration process comprises wet oxidation.

13. The process according to claim 11, in which the adsorbent regeneration process comprises anaerobic biological digestion for a period of 10 to 60 days.

14. A continuous process for treating wastewater, comprising the steps of:
(a) passing influent wastewater downward through a first fixed media filter through which air passes by natural ventilation and having microorganisms growing on the media surface;
(b) thereafter passing the wastewater from said first fixed media filter to a first gravity settler-clarifier, removing solids thereby and forming a first stage clarified wastewater;
(c) adding to the first stage clarified wastewater from step (b) a solid powdered adsorbent capable of adsorbing impurities from said wastewater, forming a mixture thereby;
(d) passing said mixture downward through a final fixed media filter through which air passes by natural or forced ventilation and having microorganisms growing on the media surface, whereby wastewater, adsorbent, microorganisms and air are intimately contacted;
(e) thereafter separating solids from the mixture passing from said final filter in a final gravity settler-clarifier to produce a final stage clarified wastewater;
(f) thereafter adding adsorbent-containing separated solids from final gravity settler-clarifier to further portions of influent wastewater and passing influent wastewater and solids downward through the first fixed media filter whereby wastewater, adsorbent, microorganisms and air are intimately contacted;
(g) thereafter passing wastewater and solids from first fixed media filter in step (f) to first gravity-clarifier where solids are separated from the wastewater to produce a first stage clarified wastewater;
(h) passing a portion of separated solids from first gravity settler-clarifier to a regeneration process where adsorbed and settled wastewater constituents and microorganisms are destroyed and the adsorptive properties of the adsorbent are restored;
(i) recycling regenerated solids from step (h) to first stage clarified wastewater of step (g) and passing the resulting mixture through the final fixed media filter in step (d);
(j) recycling a portion of the remaining first stage separated solids from step (g) to the influent wastewater in step (f);
adding fresh make-up adsorbent to compensate for adsorbent losses;
(l) removing ash which builds up in the system;
(m) discharging final stage clarified wastewater from a final gravity settler-clarifier; and
(n) repeating steps (c) through (m) in a continuous manner.

15. The process according to claim 14, wherein the adsorbent is powdered activated carbon having particle diameters of 0.03 to 0.3 mm.

16. The process according to claim 14, in which the amounts of adsorbent added ranges from 25 to 8000 mg/l.

17. The process according to claim 14, further comprising the preliminary step of removing suspended solids from the influent wastewater.

18. The process according to claim 14, further comprising the step of adding a flocculating agent to the mixture entering the final gravity settler-clarifier.

19. The process according to claim 14, wherein the further treatment step for final stage clarified wastewater comprises passing said clarified wastewater through a particulate media filter.

20. The process according to claim 14, further comprising the step of recycling a portion of the wastewater-adsorbent mixture which has passed through each fixed media filter, to the wastewater stream entering each same filter, at a rate equivalent of up to 300 percent of the wastewater stream entering the process.

21. The process according to claim 14, further comprising the step of recycling a portion of adsorbent-containing separated solids from final gravity settler-clarifier to first stage clarified wastewater passing to the final fixed media filter.

22. The process according to claim 14, wherein the adsorbent regeneration process comprises wet oxidation.

23. The process according to claim 14, wherein the adsorbent regeneration process comprises anaerobic biological digestion for a period of 10 to 60 days.

24. The process according to claim 14, further comprised of a like additional treatment stage interposed between said first and final stages, in said additional stage wherein clarified wastewaters from the prior stage and separated solids from the following stage are together passed downward through a fixed media filter and thereafter separated; separated solids are passed to wastewater entering the previous stage, and clarified wastewater is passed to the following stage.

25. A continuous process for treating wastewater in a 2 to 4 stage fixed media filter system without intermediate clarification, wherein air passes by natural or forced ventilation through the fixed media filters and the filter media has microorganisms attached thereto, comprising the steps of:
(a) adding to the wastewater a powdered adsorbent capable of adsorbing impurities from said wastewater, forming a mixture thereby;
(b) passing said mixture downward through each fixed media filter in series;
(c) thereafter separating solids from the mixture of wastewater and solids passing from the final fixed media filter, obtaining treated clarified wastewater thereby; and
(d) discharging said treated and clarified wastewater.

26. The process according to claim 25, comprising the further step of returning a portion of the mixture of wastewater and solids which pass from the final fixed media filter to further portions of influent wastewater entering the system in step (a), in volume equivalent of up to 300 percent of said influent wastewater.

27. The process according to claim 25, further comprising the step of recycling a portion of the mixture of wastewater and adsorbent which has passed through each fixed media filter, to the wastewater stream entering each same filter, at a rate equivalent of up to 300 percent of the wastewater stream entering the process.

28. The process according to claim 25, further comprising the step of returning a portion of the separated solids from step (c) to further portions of influent wastewater in step (a).

29. The process according to claim 25, wherein the adsorbent is powdered activated carbon having particle diameters of 0.03 to 0.3 mm.

* * * * *

UNITED STATES PATENT AND TRADEMARK OFFICE
CERTIFICATE OF CORRECTION

PATENT NO. : 4,407,717

DATED : October 4, 1983

INVENTOR(S) : Gerald H. Teletzke and Allen H. Erickson

It is certified that error appears in the above-identified patent and that said Letters Patent is hereby corrected as shown below:

Column 5, line 42, "generated" should read --regenerated--.

Column 6, line 7, insert "(h)" before --passing--.

Column 13, line 59, "solid" should read --solids--.

Column 15, line 67, Claim 14, insert "(k)" before --adding--.

Signed and Sealed this

Third Day of January 1984

[SEAL]

Attest:

GERALD J. MOSSINGHOFF

Attesting Officer     Commissioner of Patents and Trademarks